(12) United States Patent
Hagelund

(10) Patent No.: US 9,047,104 B2
(45) Date of Patent: *Jun. 2, 2015

(54) INTERNATIONALIZATION TECHNOLOGY, INCLUDING ASSOCIATING A TEXT STRING IN A TARGET COMPUTER PROGRAM WITH AN ATTRIBUTE OF A USER-INTERFACE ELEMENT

(75) Inventor: Peter Hagelund, Monmouth Jct, NJ (US)

(73) Assignee: International Business Machines Corporation, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 13/423,163

(22) Filed: Mar. 16, 2012

(65) Prior Publication Data

US 2012/0192058 A1    Jul. 26, 2012

Related U.S. Application Data

(63) Continuation of application No. 12/617,543, filed on Nov. 12, 2009, now Pat. No. 8,707,172.

(51) Int. Cl.
G06F 17/00 (2006.01)
G06F 3/14 (2006.01)
G06F 9/44 (2006.01)

(52) U.S. Cl.
CPC .................... *G06F 9/4448* (2013.01)

(58) Field of Classification Search
CPC ... G06F 9/4448; G06F 17/289; G06F 17/211; G06F 17/30141; G06F 8/51
See application file for complete search history.

(56) References Cited

U.S. PATENT DOCUMENTS

| | | |
|---|---|---|
| 5,835,768 A | 11/1998 | Miller |
| 6,185,729 B1 | 2/2001 | Watanabe |
| 6,931,628 B2 | 8/2005 | Mcgeorge |
| 7,103,875 B1 | 9/2006 | Kaneko |
| 7,137,108 B1 | 11/2006 | Kumhyr |
| 7,152,222 B2 | 12/2006 | Kumhyr |
| 7,177,793 B2 | 2/2007 | Barker |

(Continued)

OTHER PUBLICATIONS

Shenoy Srihanth et al., J2EE Project-Chapter 19 Internationalization and Localization, Jan. 10, 2006, objectsource, pp. 1-32.

(Continued)

*Primary Examiner* — Kavita Padmanabhan
*Assistant Examiner* — Ariel Mercado
(74) *Attorney, Agent, or Firm* — Anthony V. S. England; Terry J. Carroll

(57) ABSTRACT

Internationalizing a target program includes associating a text string in the program with an attribute of a user interface element ("UI"). The UI element is defined in the program and the associating is provided at least partly by a non-executable UI element annotation in the program. A resource bundle annotation in the program defines a name for a resource bundle to which the text string of the UI element annotation may be extracted. An annotation processor program automatically creates the resource bundle by processing source code of the target program, including the UI element annotation and the resource bundle annotation. Executing a method in the target program causes the text string to be displayed on the attribute for a displayed instance of the UI element. The method determines whether to obtain the displayed text string from the UI element annotation or from the resource bundle.

6 Claims, 8 Drawing Sheets

(56) References Cited

U.S. PATENT DOCUMENTS

| | | |
|---|---|---|
| 7,440,888 B2 | 10/2008 | Chen |
| 7,730,498 B2 | 6/2010 | Resnick |
| 2002/0162093 A1 | 10/2002 | Zhou |
| 2002/0165885 A1* | 11/2002 | Kumhyr et al. .............. 707/536 |
| 2003/0079051 A1 | 4/2003 | Moses |
| 2003/0160810 A1 | 8/2003 | Talley |
| 2005/0050548 A1 | 3/2005 | Sheinis |
| 2007/0061789 A1 | 3/2007 | Kaneko |
| 2008/0141117 A1 | 6/2008 | King |
| 2008/0300859 A1 | 12/2008 | Chen |
| 2009/0031238 A1 | 1/2009 | Berstis |

OTHER PUBLICATIONS

O'Conner John, Java Internationalizaiton: Localization with Resource Bundles, 1998 Java.sun, pp. 1-6.
Mar. 14, 2012 U.S. Appl. No. 12/617,543 NFR.
Aug. 21, 2012 U.S. Appl. No. 12/617,543 FR.
Aug. 30, 2013 U.S. Appl. No. 12/617,543 NFR.
Dec. 6, 2013 U.S. Appl. No. 12/617,543 NOA.
IBM Technical Disclosure, "A Java internationalization technique using property files," IPCOM000140541D, Sep. 12, 2006.

* cited by examiner

INTERNATIONALIZATION TECHNOLOGY, INCLUDING ASSOCIATING A TEXT STRING IN A TARGET COMPUTER PROGRAM WITH AN ATTRIBUTE OF A USER-INTERFACE ELEMENT

CROSS REFERENCE TO RELATED APPLICATION

This is a continuation of, and hereby claims the benefit of the priority date of, application Ser. No. 12/617,543, now U.S. Pat. No. 8,707,172, which was filed Nov. 12, 2009, and issued Apr. 22, 2014.

BACKGROUND

The present invention relates to providing and maintaining national language support (NLS) messages for a computer program, allowing the program to be translated into other languages.

Most commercial program products sold to regions outside the United States must be translated to languages used in those regions. This usually means that certain national language-related matter is kept outside a program's source code, so that the matter is not compiled into the program's executable code. Otherwise, the program's executable code would have to be rebuilt and tested for each language. This matter typically includes text to be displayed when a program is run and file names for images and other iconage to be displayed when the program is run.

The national language-related matter is conventionally kept in files that are separate from the source code. This allows the text in the separate files to be translated independently of the source code. Within the realm of Java-based programs, this is typically done by employing simple text files loaded and maintained as resource bundles. Each text file includes keys and values, usually several of each. In this context, a key is a well-known name and a value is text corresponding to the key and that needs to be translated. When it is time for translation, resource bundle technology, which is built into Java technology, automatically selects an appropriate national language based on the current locale—defaulting to the English language if the language for that locale is unavailable.

SUMMARY OF THE INVENTION

A computer program product for internationalization is provided, according to one form of an embodiment of the invention. In other forms, systems and computer implemented methods are provided.

In one implementation, a method for internationalizing a target program includes associating a text string in a target computer program with a respective attribute of a user-interface element. The user interface element is defined in the target computer program and the associating is provided, at least in part, by a user interface element annotation in the target computer program. The user interface element annotation is non-executable.

In another aspect, a computer system executing an internationalize method in the target program causes the text string to be displayed on a respective attribute of a displayed instance of the user interface element. Executing the internationalize method obtains the displayed text string directly from the text string of the user interface element annotation.

In another aspect, a resource bundle annotation in the target program defines name for a resource bundle to which the text string of the user interface element annotation may be extracted.

In another aspect, a computer system executing an annotation processor program creates the resource bundle. The annotation processor program execution processes source code of the target program, which includes processing the user interface element annotation and resource bundle annotation.

In another aspect, processing the user interface element annotation and resource bundle annotation includes the annotation processor program extracting the text string from the user interface element annotation, extracting the resource bundle name from the resource bundle annotation and storing the text string in computer readable storage media as a resource bundle having the extracted resource bundle name.

In another aspect, obtaining the displayed text string includes parsing the user interface element annotation by executing the internationalize method.

In another aspect, for causing the text string to be displayed on the respective attribute of the user interface element, executing the internationalization method includes determining the attribute of the user interface element for which an internationalized text string is to be displayed by reading the parsed user interface element annotation.

In another aspect, obtaining the displayed text string directly from the text string of the user interface element annotation is in response to failing to detect the resource bundle.

In another aspect, in response to an instance wherein executing the internationalize method determines that the resource bundle exists, the executing of the internationalize method obtains the displayed text strings by parsing the resource bundle annotation, reading the file name of the resource bundle from the parsed resource bundle annotation, and reading the text string in the resource bundle for the respective aspect of the interface element determined from reading the parsed user interface element annotation.

In another form of the invention, a system for internationalizing a target program includes a computer readable storage medium having a target program stored thereon, a microprocessor for processing the target program, and a display. The system is configured with the target program and the microprocessor to associate a text string in the target computer program with an attribute of a user-interface element defined in the target computer program. The associating is provided, at least in part, by a non-executable user interface element annotation in the target computer program, the user interface element annotation. The system is further configured with the target program and the microprocessor to cause the display to display the text string on the attribute for a displayed instance of the user interface element by the microprocessor executing an internationalize method of the target program. Executing the internationalize method obtains the displayed text string directly from the text string of the user interface element annotation.

In another aspect, the system includes a computer readable storage medium having an annotation processor program stored thereon. The system is further configured with the target program and the microprocessor to define a name for a resource bundle to which the text string of the user interface element annotation may be extracted. The defining is provided, at least in part, by a resource bundle annotation in the target program. The system is further configured with the annotation processor program and the microprocessor to create the resource bundle by the microprocessor executing the annotation processor program. The executing annotation processor program processes source code of the target program, including processing the user interface element annotation and resource bundle annotation.

In another aspect, in order to create the resource bundle the system is configured with the annotation processor program such that the microprocessor executes the annotation processor program to extract the text string from the user interface element annotation, extract the resource bundle name from the resource bundle annotation and store the text string in computer readable storage media as a resource bundle having the extracted resource bundle name.

In another aspect, the system is configured with the target program and the microprocessor to obtain the displayed text string by the microprocessor executing the internationalize method of the target program comprises the system being configured with the target program and the microprocessor to parse the user interface element annotation by executing the internationalize method.

In another aspect, the target program and the microprocessor are further configured for causing the text string to be displayed on the respective attribute of the user interface element by the microprocessor executing the internationalization method to determine the attribute of the user interface element for which an internationalized text string is to be displayed by reading the parsed user interface element annotation.

In another aspect, the target program and the microprocessor are further configured such that obtaining the displayed text string directly from the text string of the user interface element annotation is in response to failing to detect the resource bundle.

In another aspect, the target program and the microprocessor are further configured such that in response to an instance wherein executing the internationalize method determines that the resource bundle exists, the executing of the internationalize method obtains the displayed text string by parsing the resource bundle annotation, reading the file name of the resource bundle from the parsed resource bundle annotation, and reading the text string in the resource bundle for the respective attribute of the interface element determined from reading the parsed user interface element annotation.

In another form of the invention, a computer readable storage medium has executable program code stored thereon instructing a microprocessor to internationalize a target program. The executable program code includes computer readable code configured to execute as an internationalize method in the target program. The target program includes a non-executable, user interface element annotation for associating a text string in the annotation with an attribute of a user-interface element, wherein the internationalize method instructs the microprocessor to cause the text string to be displayed on the attribute for a displayed instance of the user interface element. Executing the internationalize method obtains the displayed text string directly from the text string of the user interface element annotation.

In another aspect, the target program includes a resource bundle annotation defining a name for a resource bundle to which the text string of the user interface element annotation may be extracted. The executable program code of the computer readable storage medium computer readable code configured as an annotation processor to process source code of the target program, including processing the user interface element annotation and resource bundle annotation, and create the resource bundle responsive to processing the user interface element annotation and resource bundle annotation.

In an additional aspect, the computer readable storage medium of has executable program code stored thereon instructing the microprocessor to perform additional processes as described herein.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
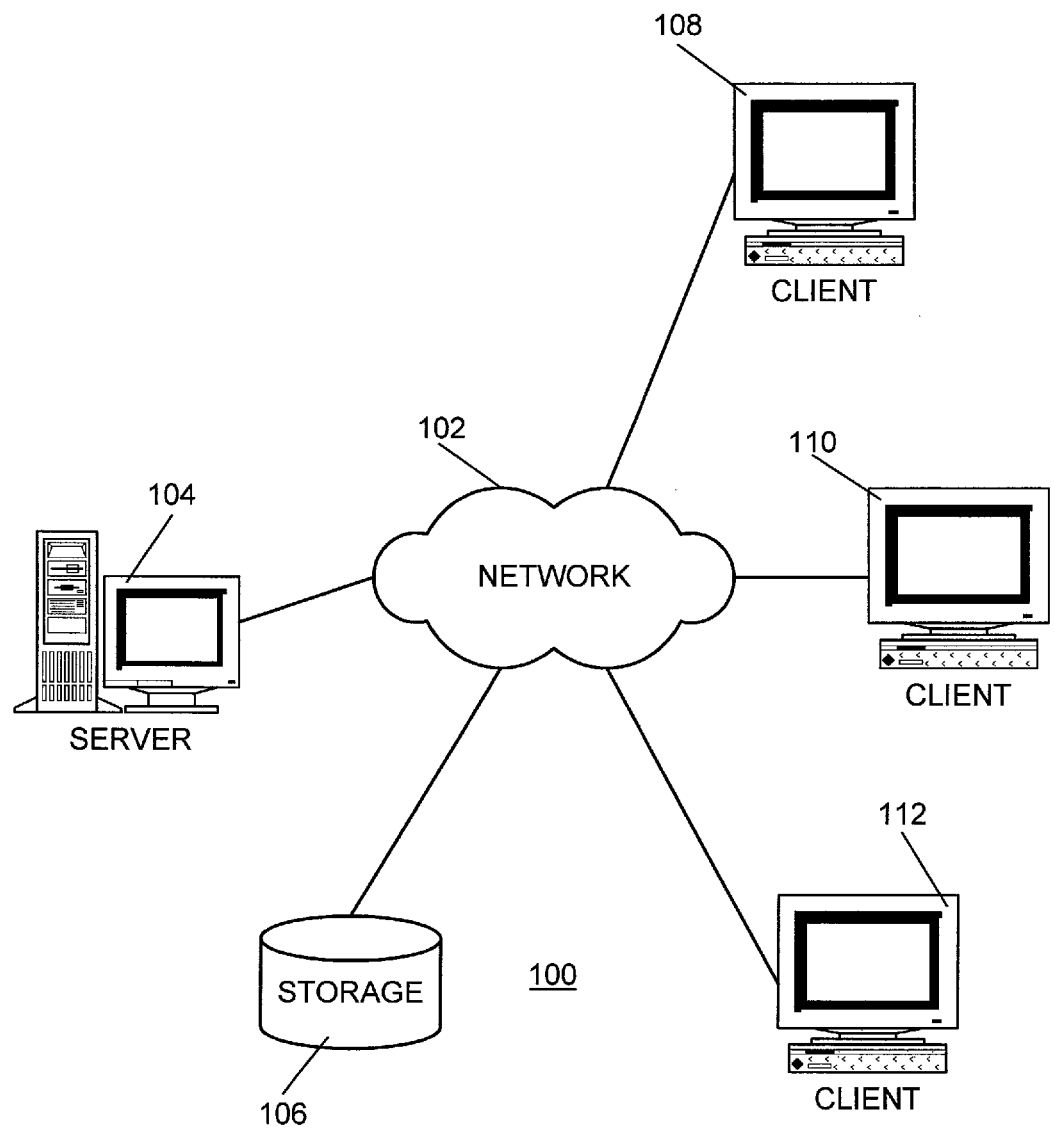
FIG. 1 is an exemplary block diagram illustrating a distributed data processing system according to an embodiment of the invention.

The present invention involves recognition that while the resource bundle solution described above works well at run-time, it presents problems, particularly during development. Further, the invention involves a recognition of various ways in which the resource bundle solution is problematic during development.

Among other things, it is problematic for developers to manually maintain separate, national language-related, resource bundle text files. And it is problematic not only to ensure the presence of all text strings therein, but to also ensure that no extraneous/unused text strings are present in the text files, which is also desirable since extra text adds to the time and cost of translation while adding no value to the product. In one respect, this is problematic because of the amount of information that must be manually maintained, since each user interface element may need several text values, such as the displayed text (e.g. a label or button text), a tool tip and perhaps an on-line help snippet. It also results in extra manual work to maintain NLS matter in simple text files during development because the arrangement is ill suited for human use. For example, the text in the text files is not inherently presented to a developer in a context that he or she needs for information engineering such as on-line documentation. A format like the DITA extensible markup language ("XML") format would be better for providing context to the developer for information engineering, but the DITA format is not usable by the Java run-time. Furthermore, since it is a manual and error prone process to keep all text keys unique during development, this is also problematic, especially when multiple developers are collaborating on a part of a program.

Additionally, during development, test and debugging developers spend valuable time on tweaking the national language-related, resource bundle text files over and over again without adding any value to that part of the development lifecycle.

In an embodiment of the present invention, NLS support messages (also referred to herein as "annotations") are located in the source code of a computer program product during development, testing and debugging of the source code, but then during a next phase, the product build phase, an annotation processor automatically extracts the annotations from the source code and stores the extracted annotations as a part of the computer program product in the form of either resource bundle text files or DITA XML topics. Therefore, while developing, testing and debugging; human developers may observe national-language related text in its immediate source code context as Java annotations. Thus, while fine-tuning a user interface of a target program before the product build phase, the developer works exclusively within the Java language and associated tooling in one embodiment of the invention. Further, during product testing and debugging, just as during the build phase, a method of the target program extracts the national-language related text directly from the Java annotations, so that at testing and debugging run time this extracted text is displayed.

The annotations are a part of the Java specification and language, not an after-the-fact add on. Therefore, the compiler validates the annotations according to their definitions. If the compiler determines an annotation is no longer needed, it marks the annotation as unused, which alerts the developer immediately to any potential problem. This arrangement also avoids the need described herein above for manually maintaining conventional NLS-related overhead during development, testing and debugging, such as maintaining keys both in the source code and in the text files.

When a computer program product is built and delivered, the extracted text files are included in the product's computer readable storage media, ensuring that at run-time all the text will be read from the resource bundles by the Java virtual machine running on the computer system that executes the compiled, i.e., bytecode, form of the computer program product. This allows the normal translation process to happen reliably.

It is an advantage that the one or more embodiments of the invention disclosed herein do not require any changes to translation and testing processes.

From the foregoing it should be appreciated that the arrangement disclosed herein allows both automatically extracting the annotation text in the source code and automatically plugging it directly into on-line documentation, While developing, testing and debugging the developers see immediately (in the UI) what is in the annotations. As a part of the next (build) phase, the annotation values are extracted and can be used for both the resource bundle content as well as e.g. DITA.

In one embodiment, the NLS annotations of the present invention are implemented as Java code metadata elements, which are essentially type-safe value holders that can be used for a variety of things and that are implemented in the Java language itself, but with some syntactical differences and limitations to provide novel functionality, as described herein. In accordance with conventional Java code syntax, the NLS annotations, in an embodiment of the invention, begin with an at-sign (@) followed by an annotation type, "NLS" at the end of the annotation type, and a parenthetical list of element-value pairs, where the values are compile-time constants.

Annotations are like very simple Java classes that only contain fields and no code that the Java Engine inherently treats as executable code. It is an advantage of this arrangement that NLS annotations do not directly influence the resulting executable code in some respects.

Figure 4:
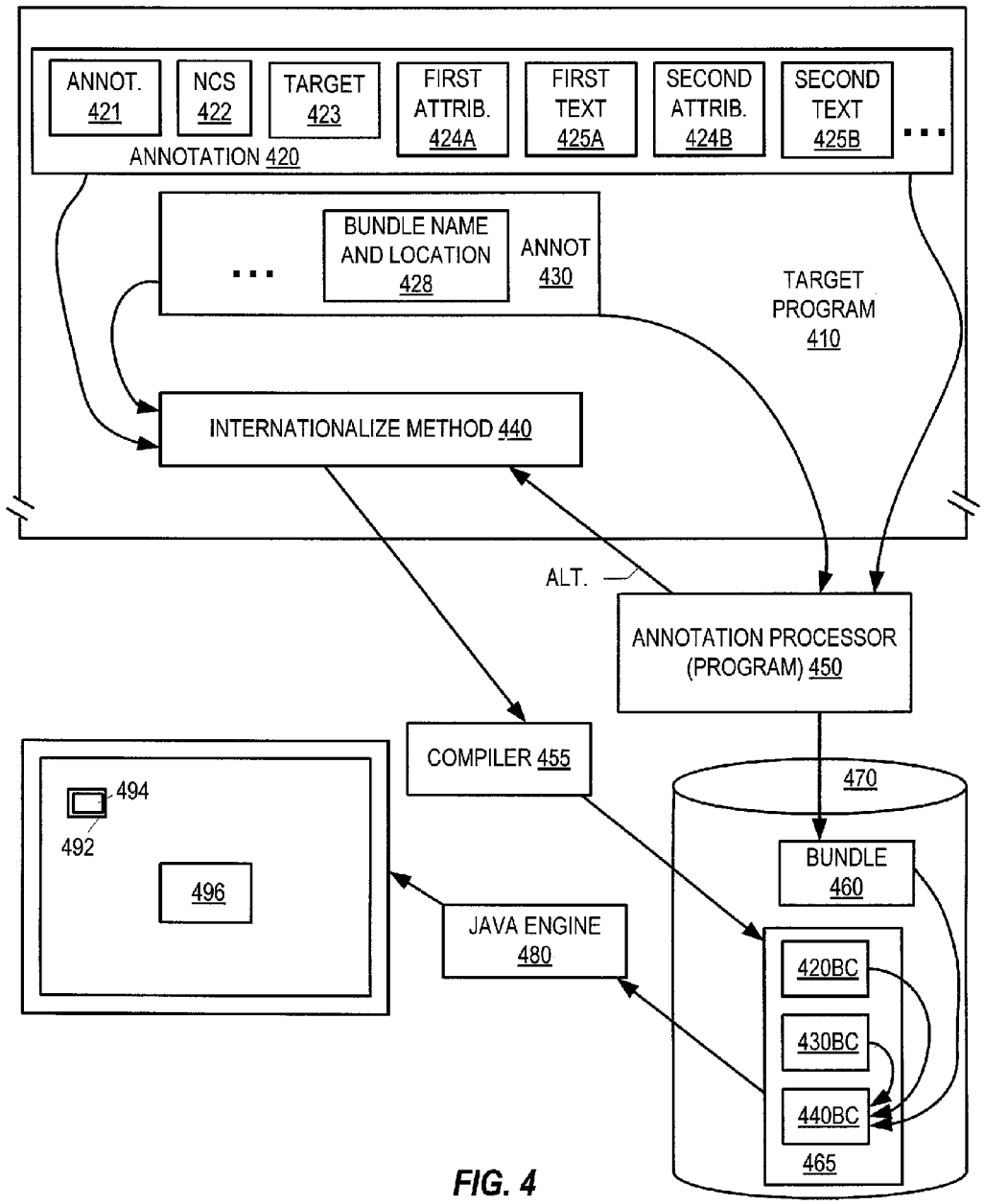
FIG. 4 is an exemplary block diagram that provides an overview of processes, structures and computer program products, according to an embodiment of the present invention

FIG. 4 provides an overview of processes, structures and computer program products, according to an embodiment of the present invention. In source code of target program 410, an NLS annotation 420 (e.g., "@ButtonNLS . . . ", etc. in the code snippet example further below) defines text strings 425A and 425B for a user-interface element, which is a button in the example and which is rendered on display 490 as button 492 in the illustrated instance. In an embodiment of the present invention described herein, annotation 420 includes a character 421 that indicates annotation 420 is an annotation, the string "NLS" 422 that indicates annotation 420 is a natural language support annotation, a target indicator 423, which indicates that annotation 420 is for a button interface element in the illustrated example herein, first and second attributes 424A and B of the interface element, and text strings 425A and B for respective attributes 424A and B, which indicate that the text strings 425A and B are for the button itself and for a tool tip in the illustrated example herein. (In this example of FIG. 4, a single annotation 420 is described. However, it should be understood that there may be more than one.)

Bytecode 420BC (compiled for annotation 420 from source code program 410 by compiler 455) is not treated by Java engine 480 as an instruction for execution, since it is an annotation. Thus, annotation 420 (and its bytecode counterpart 420BC) provides a definition in program 410 (and its compiled counterpart 465) of associations among text strings 425A and 425B and respective attributes 424A and 424B of user-interface element 423, but bytecode 420BC for this annotation 420 is not itself directly executed by Java engine 480 to cause text strings 425A and 425B to be displayed as text strings 494 and 496 on displayed user-interface element 492.

Another annotation 420 ("@BundleName . . . ", etc. in the example further below) defines a name and location 428 for a resource bundle 460 to which the NLS text strings 425A and 425B of annotation 420 are extracted at build time by an annotation processor 450. Again, bytecode 430BC for annotation 430 is not treated by Java engine 480 as an instruction for execution. Annotation 430BC defines a name and location 428 for resource bundle 460, but the bytecode 430BC for annotation 430 is not itself directly executed by Java engine 480 in order to cause resource bundle 460 to be created and stored on computer readable storage media 470.

Bytecode 440BC for code 440 ("demoButton= . . . " etc. in the example further below) is executed by the Java engine. Its execution invokes an internationalize method, aspects of which are disclosed in FIGS. 9 and 10 herein. Execution of this internationalize method causes text strings 425A and 425B to be displayed as text strings 494 and 496 on user interface element 492 attributes, i.e., on the attributes defined by annotation 420 attributes 424A and 424B. However, execution of the internationalize method has to first get annotation 420 text strings 425A and 425B. (Herein, the term "get" is used in the general sense of "obtain" and is not necessarily intended to limit the invention to any particular get protocol.) It gets text strings 425A and 425B either from resource bundle file 460 (per the name defined by the second annotation), if file 460 has been created, or directly from the bytecode 420BC version of text strings 425A and 4256 of annotation 420BC, if resource bundle file 460 has not yet been created.

That is, execution of bytecode 440BC for the method parses bytecode versions 420BC and 430BC of annotations 420 and 430. Responsive to reading parsed annotation 420BC, the internationalization method determines the defined attributes 424A and 424B of the user-interface element for which internationalized text strings 425A and 425B are to be displayed. Responsive to reading parsed annotation 430BC (if annotation 430BC exists in the program), the method invoked by bytecode 440BC determines the name and path 428 for the resource bundle 460. Annotation 430BC may or may not exist, depending on the context. For example, if program 410 is still in development, the developer may not have yet inserted annotation 430BC in program 410 to define a resource bundle 460 for internationalizing. Likewise, even if annotation 430BC has been inserted in program 410, resource bundle 460 may or may not actually exist, depending on whether resource bundle 460 has been created and whether it has been stored on computer readable storage media 470 accessible by the internationalization method invoked by bytecode 440BC of compiled program 465. Again, program 410 may still be in development, and the developer may not have yet created the resource bundle 460, even if the developer has inserted annotation 430, which defines the resource bundle 460 name and location 428. Alternatively, the developer may have created the resource bundle 460, and it may be accessible to the method, such as, for example, on computer readable storage media upon which a built version of the computer program product 410 has been delivered.

If the internationalize method determines that the resource bundle 460 exists, then it reads the bytecode version of text strings 425A and B in resource bundle 460 for the respective attributes 424A and B defined by annotation 420. If the internationalize method determines that the resource bundle 460 does not exist, then it reads the bytecode version of text strings 425A and B from annotation 420BC. Once the internationalize method has read the bytecode version of text strings 425A and B, either from resource bundle 460 or annotation 420BC, it then displays the text strings on their respective attributes.

Regarding creating the resource bundle file 460, which is done at build time, this is where NLS annotation processor 450 comes in. NLS annotation processor 450 is a stand-alone program that processes the source code of target program 410 when executed by a computer system, which includes processing annotations 420 and 430, of course. Responsive to a computer system executing NLS annotation processor 450, the computer system extracts the text from the annotation 420BC and stores it in computer readable storage media 470 as a resource bundle 460, at a location and name 428 as defined by annotation 430BC. NLS annotation processor 450 is executed, i.e., processes source code 410, right before or after compilation for a build.

The internationalize method invoked by code 440 has the above described two ways to get annotation 420 text 425A and B so that source code 410 can be compiled and executed during development without going through the extra step of creating a resource bundle file 460 for NLS annotation 420 (and others like it), and without even reading an existing file 460. That is, if source code 410 is compiled and executed without also creating resource bundle 460 (which would be done by running NLS annotation processor 450), then when the internationalize method is executed, it gets text 425A and B for the user-interface element defined by target 423 from annotation 420.

Referring now to TABLE 1 herein below, an NLS annotation, ButtonNLS, is shown in source code context for an embodiment of the present invention. A common user interface element, a simple push button ("demoButton" in the example), has three pieces of textual information associated with it via an NLS annotation. The three pieces of textual information are as follows:

1. The text the program displays on the face of the demoButton;
2. The tool tip, which is text the program displays as a "tip," i.e., a hint, responsive to the user hovering the mouse pointer over the tool; and
3. A snippet of on-line help text that the program displays as contextual help or that is included in the on-line documentation (to which the program may provide a link).

TABLE 1

| | |
|---|---|
| 42⊖ | /** |
| 43 | * The demo button. Used to launch a demo of . . . |
| 44 | */ |
| 45⊖ | @ButtonNLS(text = "Demo", toolTipText = "Click to launch demonstration", help = "Click |
| 46 | private Button demoButton; |

In the above example, text is intentionally omitted at the ends of lines 43 and 45. Line 46 is a conventional instruction that causes the program to display a Button user interface element, where Button is a class of user interface elements and in the illustrated instance a Button is defined that is called "demoButton." In line 45 the NLS annotation is provided. Although the illustrated NLS annotation is called "ButtonNLS," it is understood by the compiler to be the NLS annotation for demoButton, since it immediately precedes line 46, which defines the demoButton instance.

The above example illustrates that the annotation, which is in the source code, enables executable code, which is compiled from the source code, to cause a processor to access and display text when the processor runs the executable code, although the compiler does not treat the annotation as an instruction.

On the other hand, because the NLS annotations exist in the source code in the immediate context of the user interface instructions with which they are associated, and because each kind of user interface element has its own corresponding kind of annotation, as illustrated in the above example for a button, this tends to reduce the potential for developer error and thereby provide more certainty that correct text values are provided for respective user interface elements. Developers have the text in the code, so it's simply easier and thus they are more productive. Because the NLS annotations are located in the code with the UI elements that need them, this makes it easier for developers to locate text that is associated with the UI elements and that needs to be changed when the user interface is changed. Also, the text can be extracted and used for more than just translation—it can be used as part of the product documentation.

The annotation shown in TABLE 1 above is enough to enable the Java virtual machine to detect at run-time that the executable code has NLS-related values, that the values are associated with the button, to access the values and to display them, so that when the button is displayed it will indeed have the word "Demo" on its face and show the tool tip text "Click to launch demonstration." However, in an embodiment of the present invention, when the developer is ready to enable internationalization at build time, the developer inserts resource bundle location information in the source code, which indicates where the translated text values ultimately will go. In one implementation, this is done with another annotation at the class level, an example of which is shown in TABLE 2, as follows:

TABLE 2

30 @BundleName("com.ibm.demo.messages")
31 public class DemoPanel extends Composite {

The "BundleName" annotation defines where the annotation processor should put the NLS-related text values in a resource bundle having the indicated name and location, which is "com.ibm.demo.messages" in the illustrated example.

Figure 5:
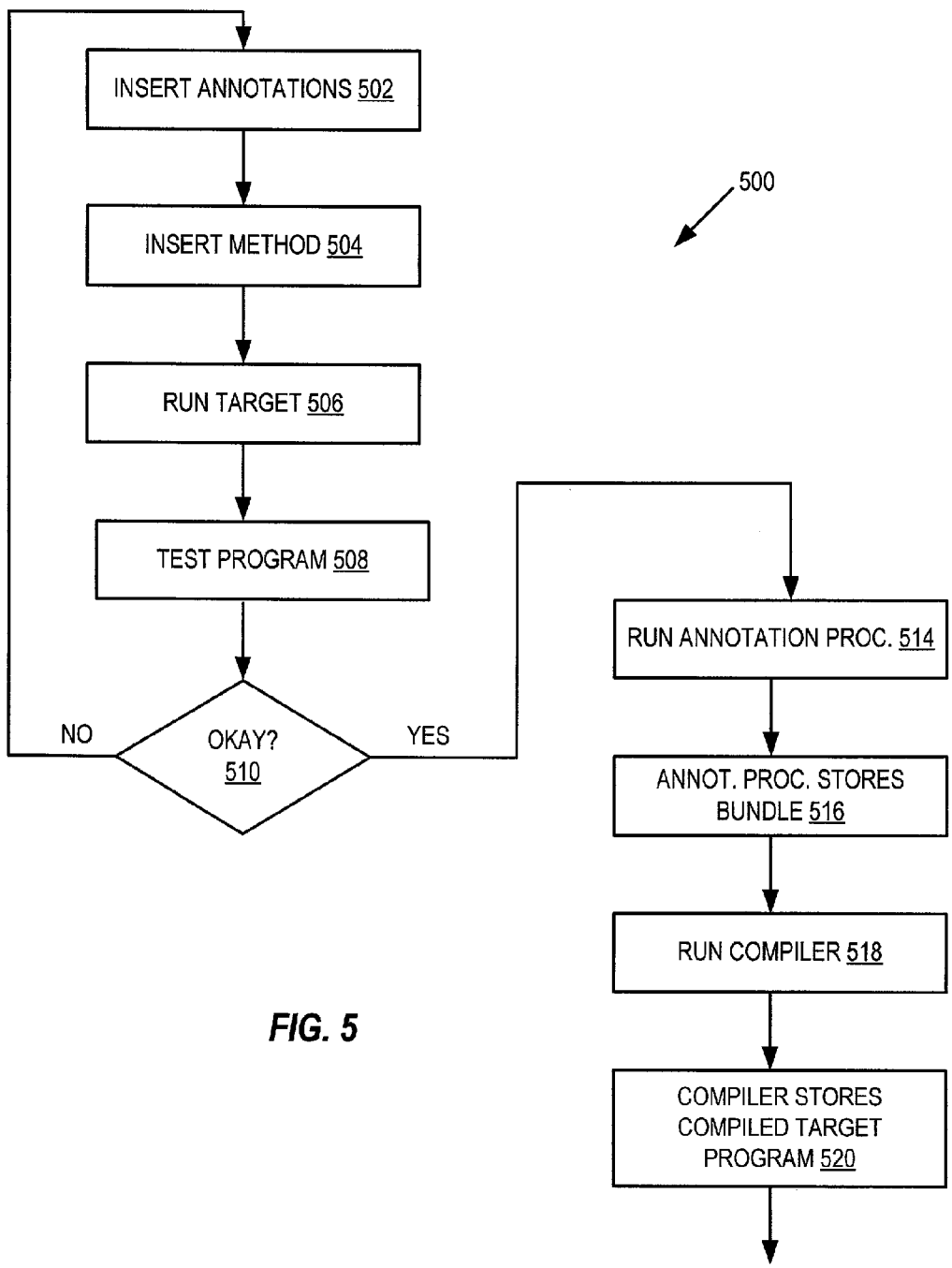
FIG. 5 is a flow chart in the overall context of a development process for target source code program, compiled target program, and a resource bundle generated from the target program by an annotation processor, according to an embodiment of the present invention.

This is illustrated in FIG. 5 as a flow chart in the overall context of a development process 500 for target program 410 (FIG. 4), compiled version 465 (FIG. 4), and resource bundle 460 (FIG. 4), according to an embodiment of the present invention. A developer inserts 502 natural language support annotations in the target program, such as described herein. One set of the natural language support annotations associate respective text strings with respective attributes of their respective annotation targets. One natural language support annotation (or set of such annotations) defines a name and location (or names and locations) and for a resource bundle (or for a set of resource bundles) to which the text strings may be extracted. The developer inserts 504 an internationalize method in the target program, such as has described herein.

The developer runs 506 the target program, and tests 508 the program to see if the internationalize method properly causes text to be displayed for associated attributes. If the testing indicates 510 corrections are needed, the developer edits the program, that is, inserts 502 corrections to the annotations or inserts 504 corrections to the method, re-execute 506 the target program, and repeats the testing 508.

Once the developer decides the test results are acceptable 510, the developer runs 514 the annotation processor, which processes the target program and thereby causes 516 the creation and storage of a resource bundle by processing the natural language support annotations. The processing includes extracting the target names, text strings, and attributes from the annotations for the targets and extracting the resource bundle name(s) and location(s) from the annotation or set of annotations for the resource bundle(s). The developer also runs 518 a compiler, which causes 520 the target program to be compiled and stored.

Additionally, internationalization needs to happen at runtime. In an embodiment of the invention, a helper class named "NLS" having an "internationalize" method is also provided in the source code to take care of that, as shown in TABLE 3, as follows:

TABLE 3

| 61 | demoButton = new Button(this, SWT.PUSH); |
| 62 | NLS.internationalize(this, "demoButton"); |

When a computer system performs the internationalize method of the NLS helper class, this causes it to attempt first to load the NLS text values from a resource bundle, or else if the system does not find the resource bundle or the text values therein, then it extracts the values directly from the NLS annotation. This is explained in more detail later herein below.

In order to guarantee proper operation in production, a sequence is followed, in an embodiment of the invention, wherein code in the executing program causes the program to first try to use a resource bundle and its associated text file. Only when that fails does the program use the values of the NLS annotations, which have been compiled into the executable code. In order to explain how this sequence is done, it's necessary to first look at how internationalization is done without annotations.

As described previously, developers conventionally create resource bundle text files and populate them with requisite key/value pairs, such as in the following example:

TABLE 4

4 demo_button_text=Demo
5 demo_button_tooltip=Click to launch demonstration
6 demo_button_help=Click this button to launch a demonstration of . . .

Usually, some reasonable naming convention is agreed upon and used throughout the text files. The above example is sufficient for a small subset of a program, where it's reasonable to expect only a single "Demo" button. For a larger part, perhaps the name of the owning class would have to be used as well: demo_panel_demo_button_text, etc.

In order to obtain the text values, it's necessary to obtain the resource bundle for the appropriate text file. The following table illustrates source code for a conventional way of doing this:

TABLE 5

| 53 | // Get the bundle. . . |
| 54 | ResourceBundle bundle = ResourceBundle.getBundle("com.ibm.demo.messages"); |

Lastly, each of the text values needs to be obtained and set on the button. The following table illustrates source code for a conventional way of doing this:

TABLE 6

| 55 | // Set the values. . . |
| 56 | demoButton.setText(bundle.getString("demo_button_text")); |
| 57 | demoButton.setToolTipText(bundle.getString("demo_button_tooltip")); |

It should be evident that this is not a very productive or intuitive way of handling NLS matter, so it's common to wrap most of the resource bundle related code into a helper class (traditionally named "Messages"), which handles the loading and caching of the resource bundle as well as obtaining the individual text values. The following table illustrates source code for a conventional way of doing this:

TABLE 7

```
64    // Set the values...
65    demoButton.setText(Messages.getString("demo_button_text"));
66    demoButton.setToolTipText(Messages.getString("demo_button_tooltip"));
```

These conventional methods require developers to manage all the aspects of the internationalization manually, including text file maintenance, creation of the Messages helper class, manually checking that all required keys are present, manually checking that no unused keys exist, and manually setting all values on the widgets. Also, the use of the Messages helper class either requires all classes in a project to share the same resource bundle, or else several Messages helper classes have to be used. If all classes share the same resource bundle, this often makes the bundle's text file very large and, correspondingly, more difficult to manage.

In order to alleviate the above outlined issues, the NLS annotation arrangements described herein, according to one or more embodiments of the present invention have been implemented to both reduce the overall amount of manual work and also to make things more flexible.

Figure 6:
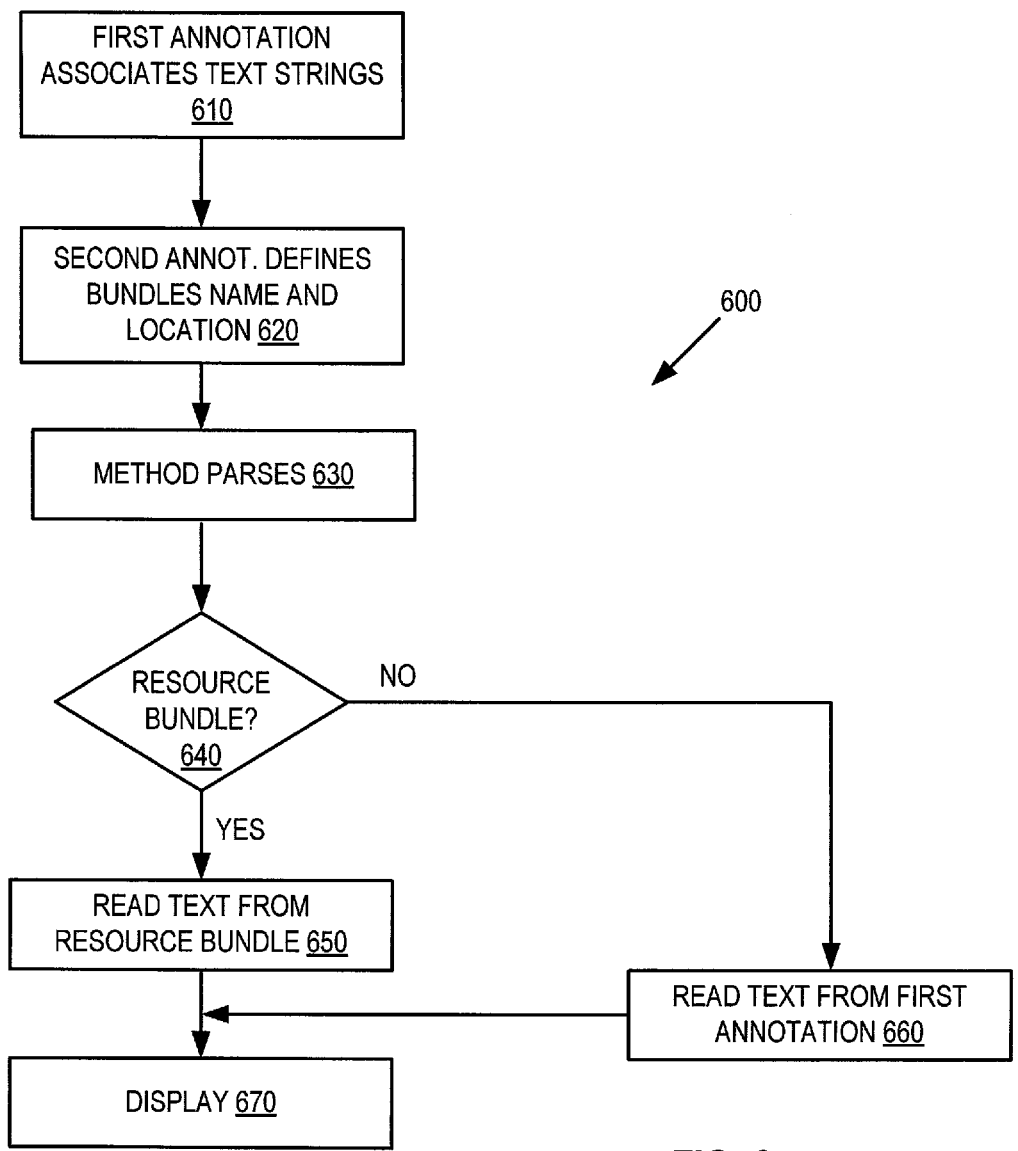
FIG. 6 is a flow chart illustrating a process caused by execution of a compiled target program by a Java engine, according to an embodiment of the present invention.

Aspects of the arrangements described above are illustrated in the flow chart of FIG. 6, according to an embodiment of the invention. Process 600 is caused by execution of compiled target program 465 (FIG. 4) by a Java engine. (In this example of FIG. 6, a single annotation like annotation 420 of FIG. 4 and a single annotation like annotation 430 of FIG. 4 is described. However, it should be understood that there may be more than one of each.) This execution may be during development with or without resource bundle 460 (FIG. 4) or may be after a build, such as execution by an end user with or without resource bundle 460.

Program 465 does not execute annotation 420 (nor annotation 430, if it exists), since they are annotations, but annotation 420 provides information associating 610 one or more text strings with attributes of its annotation target, which is used by the internationalization method of program 465. Likewise, annotation 430, if it exists, provides information defining 620 a bundle name and location, which is used by the internationalization method of program 465.

The internationalization method parses 630 annotation 420 and determines 630 its attributes from the parsed information. Likewise, if annotation 430 exists, internationalization method parses 630 annotation 430 and determines 630 the name and location for the resource bundle from the parsed information. Program 465 execution of the internationalization method then causes the computer system to determine 640 if the resource bundle of the given name exists at the given location. If yes, the method gets 650 the text strings for the attributes from the resource bundle and causes 670 the text strings to be displayed in association with those attributes. If no, the method gets 660 the text strings for the attributes from the information parsed from annotation 420 and causes 670 the text strings to be displayed in association with those attributes.

The above examples and flow chart refer to internationalizing only a single user interface element, the demoButton. However, it should be understood that in an embodiment of the invention all elements of a class are internationalized at once by invoking the internationalize method with just the class. That is, if all fields of a class were internationalized in the line 62 snippet above, i.e., instead of just the demoButton field in the example above, the code would be "NLS.internationalize ( )." Execution of this code causes the internationalize method to automatically enumerate and internationalize all relevant fields, i.e., those fields for which NLS annotations are defined.

In an embodiment of the present invention, annotations are themselves annotated with two important pieces of information:
 1. The annotations retention policy; and
 2. The annotations target.

The retention policy specifies what the compiler does with the annotation when it encounters it in the source code. In an embodiment of the present invention, there are three retention policies:
 SOURCE
 CLASS
 RUNTIME The SOURCE retention policy instructs the compiler that the annotation is for use in the source code only (often used as localized compiler directives) and not to be compiled into the resulting executable code. The CLASS retention policy instructs the compiler to compile the annotation into the executable code, but indicates to the Java virtual machine not to load and maintain it at run-time. The RUNTIME retention policy instructs the compiler to compile the annotation into the executable code and instructs the Java run-time virtual machine to load the annotation and maintain it in memory at run-time. In one implementation, the annotations all have a retention policy of RUNTIME allowing them to be retrieved from the code during the development, test and debugging phase.

The target annotation specifies Java language elements for which the annotation may be used. In an embodiment of the present invention, there are eight targets:
 TYPE
 FIELD
 METHOD
 PARAMETER
 CONSTRUCTOR
 LOCAL_VARIABLE
 ANNOTATION_TYPE
 PACKAGE The TYPE target indicates that the annotation is valid for a Java type, such as a class, interface or enumeration. The FIELD target indicates that the annotation is valid for a field of a class. The METHOD target indicates that the annotation is valid for a method of a class. The PARAMETER target indicates the annotation is valid for a parameter of a method. The CONSTRUCTOR target indicates the annotation is valid for a constructor of a class. The LOCAL_VARIABLE target indicates the annotation is valid for a local variable used within a method of a class. The ANNOTATION_TYPE target indicates the annotation is valid for an annotation. The PACKAGE target indicates the annotation is valid for an entire package. In one implementation, the annotations have targets of PACKAGE, TYPE and FIELD.

As explained above, the NLS annotations are used in two distinct ways. First, they are used during development, test and debugging, which eliminates the need for developers to maintain NLS matter in text file resource bundles. Second, the NLS annotations are used during the build process, wherein the annotation processor extracts values (text strings) of the annotations and places them in external text files for translation use.

In one aspect of an embodiment of the invention, a resource bundle name is specified either for a class or for an entire package of classes. This way, each project can be structured into as many or as few resource bundles as is needed. It may be preferred to specify a resource bundle name for an entire package of classes, in order to reduce the number of resource bundles. The following table illustrates source code for doing this in one implementation:

TABLE 8

```
4 @BundleName("com.ibm.demo.messages")
5 package com.ibm.demo;
```

Figure 7:
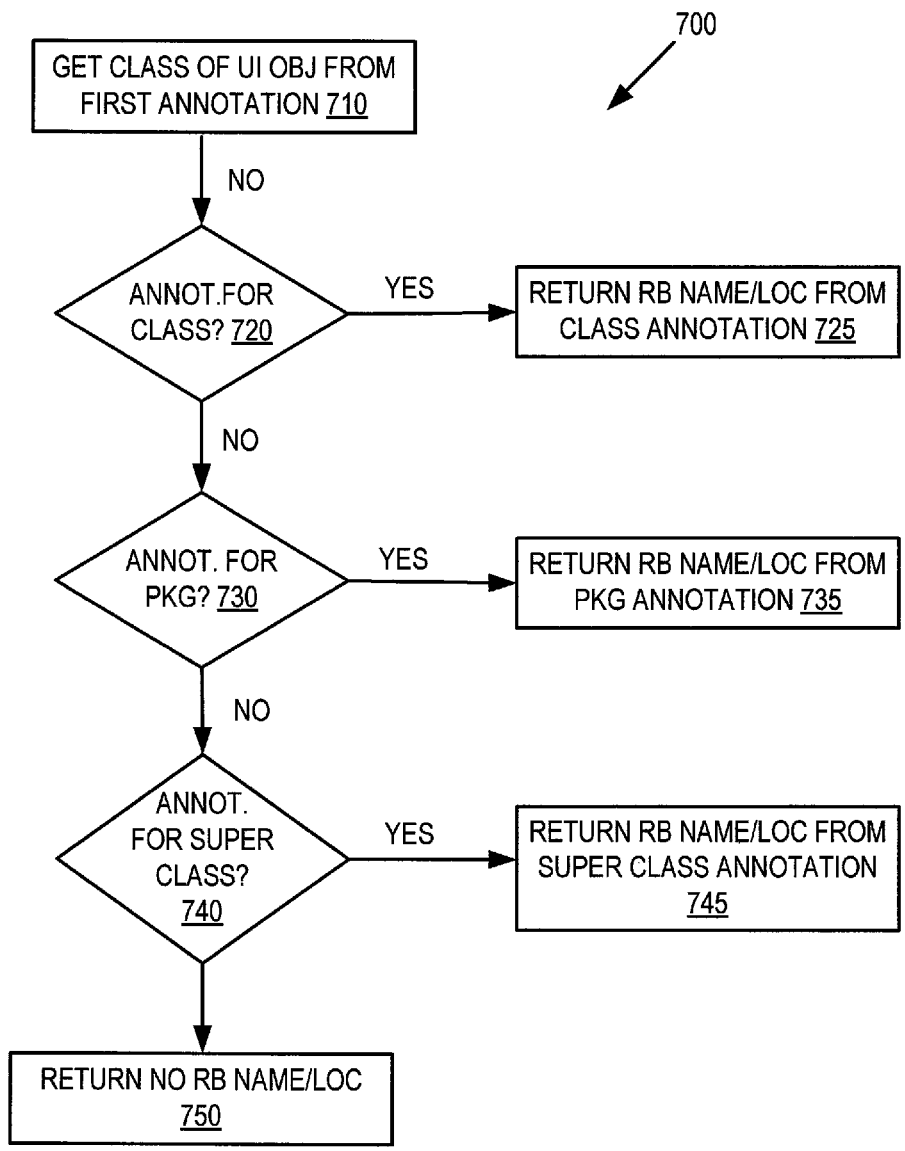
FIG. 7 is a flow chart illustrating aspects of an internationalize method of the target program, according to an embodiment of the present invention.

An algorithm to find the resource bundle name for a class is implemented as shown in FIG. 7 and described as follows, in an embodiment of the invention.

Process 700 is caused by the internationalize method invoked by bytecode 440BC (FIG. 4) during execution of compiled program 465 (FIG. 4), according to an embodiment of the present invention.

The method gets 710 the class of the object being internationalized.

The method searches through the target program code looking 720 for the annotation matching the class. If found, the method returns 725 the resource bundle name and location from the class annotation.

If not found, the method searches through the target program code looking 730 for the annotation on the package of the class. If found, the method returns 735 the resource bundle name and location from the package annotation.

If not found, the method searches through the target program code looking 740 for the class's super class. If found, the method returns 745 the resource bundle name and location from the super class annotation.

Figure 8:
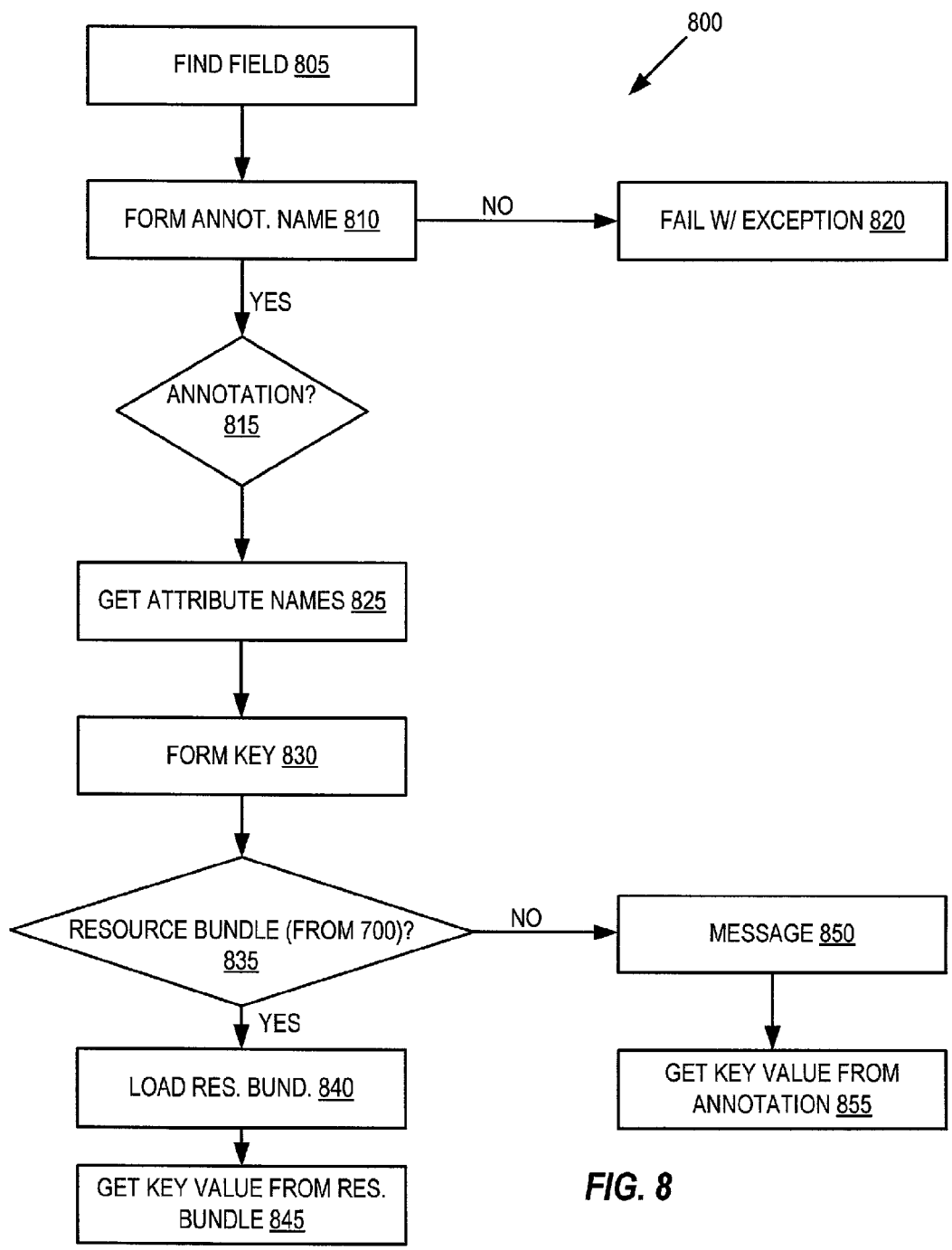
FIG. 8 is a flow chart illustrating additional aspects of an internationalize method of the target program, according to an embodiment of the present invention.

If no super class is found (i.e. the search has ended at the java.lang.Object root class), the method stops the search, returns 750 no resource bundle name and location and proceeds to perform process 800 shown in FIG. 8.

In FIG. 8, a flow chart illustrates process 800 caused by the internationalize method invoked by bytecode 440BC (FIG. 4) during execution of compiled program 465 (FIG. 4), according to an embodiment of the present invention.

The method finds 805 all fields of the class being internationalized.

For each of these fields, the method does the following:

Forms 810 the appropriate NLS annotation names for the fields (e.g. a button needs a ButtonNLS annotation; a wizard page needs a Wizard PageNLS annotation).

The method searches 815 through the target program code looking for each matching annotation. If the annotation is not found, the method returns 820 a fail with exception (which alerts the developer to the fact that a required annotation is not present).

If the annotation is found, the method extracts the annotation for the field, getting 825 all the attribute names for the annotation (e.g. text, toolTipText, etc.).

For each of these attribute names, the method forms 830 the name of a key as <class name>.<field name>.<attribute name> (e.g. DemoPanel.demoButton.text and DemoPanel.demoButton.toolTipText).

The method gets 835 the name of the resource bundle from process 700, if it was returned, loads 840 the resource bundle, and gets 845 the value of the key from the resource bundle. If the name of the resource bundle was not returned, the method returns 850 a message 850, which alerts the developer to the fact that a required annotation is not present, and gets 855 the value of the key directly from the annotation.

The two above described algorithms guarantee the following:

1. All user interface elements that require internationalization have all the text values they need (since each user interface type has a specific type of annotation which declares the text values that are relevant; e.g. a button has a ButtonNLS annotation which requires text, toolTipText and help to be defined).
2. All user interface elements that are being internationalized have an annotation associated with them (this assumes, of course, that the code is being tested).
3. All classes that have user interface elements have a bundle name associated with them (either directly or indirectly through a parent class or package).
4. Any key that is defined in a resource bundle will have its value resolved from that bundle (which ensures proper internationalization at run-time based on the locale).
5. All keys within a resource bundle are unique.

In order for the above to work in production it is, of course, necessary to ensure that all the text specified in the annotations is properly extracted and placed in text files with the correct resource bundle name(s) and with the correct keys. This processing is done using an annotation processor. An annotation processor is essentially a "plug-in" for the standard Java annotation processing tool ("apt"), which is a lightweight Java compiler that parses Java source code and constructs an in-memory abstract syntax tree ("AST") passed to each registered annotation processor. Each annotation processor is free to do what it wants with the syntax tree.

In an embodiment of the present invention, an NLS annotation processor is provided that implements the two algorithms specified above, but rather than obtaining a value for a key, the NLS annotation processor creates the value and stores it in the appropriate resource bundle. In an alternative, the NLS annotation processor stores the text values in DITA topics for use in information engineering, e.g. for editing and/or direct reuse in documentation.

In addition to the user interface elements shown in the above examples, simple strings are provided for in an embodiment of the invention. This enables translating simple messages, such as log messages. The following table illustrates source code for internationalizing log messages in one implementation:

TABLE 9

```
44⊖  @Message("Unable to launch "{0}". Reason is "{1}" and error
     code is "{2}".")
45   private String demoLaunchFailedMessage;
```

Messages can be Used for Anything, Such as Logging

TABLE 10

```
63  demoLaunchFailedMessage =
    NLS.getMessage(getClass( ), "demoLaunchFailedMessage");
64  logger.log(Level.SEVERE,
    MessageFormat.format(demoLaunchFailedMessage, "demo", "ur
```

For these simple messages, the key is only made up of two parts: the class name and the field name (e.g. DemoLogger- .demoLaunchFailedMessage), instead of the three parts employed for user interface elements.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
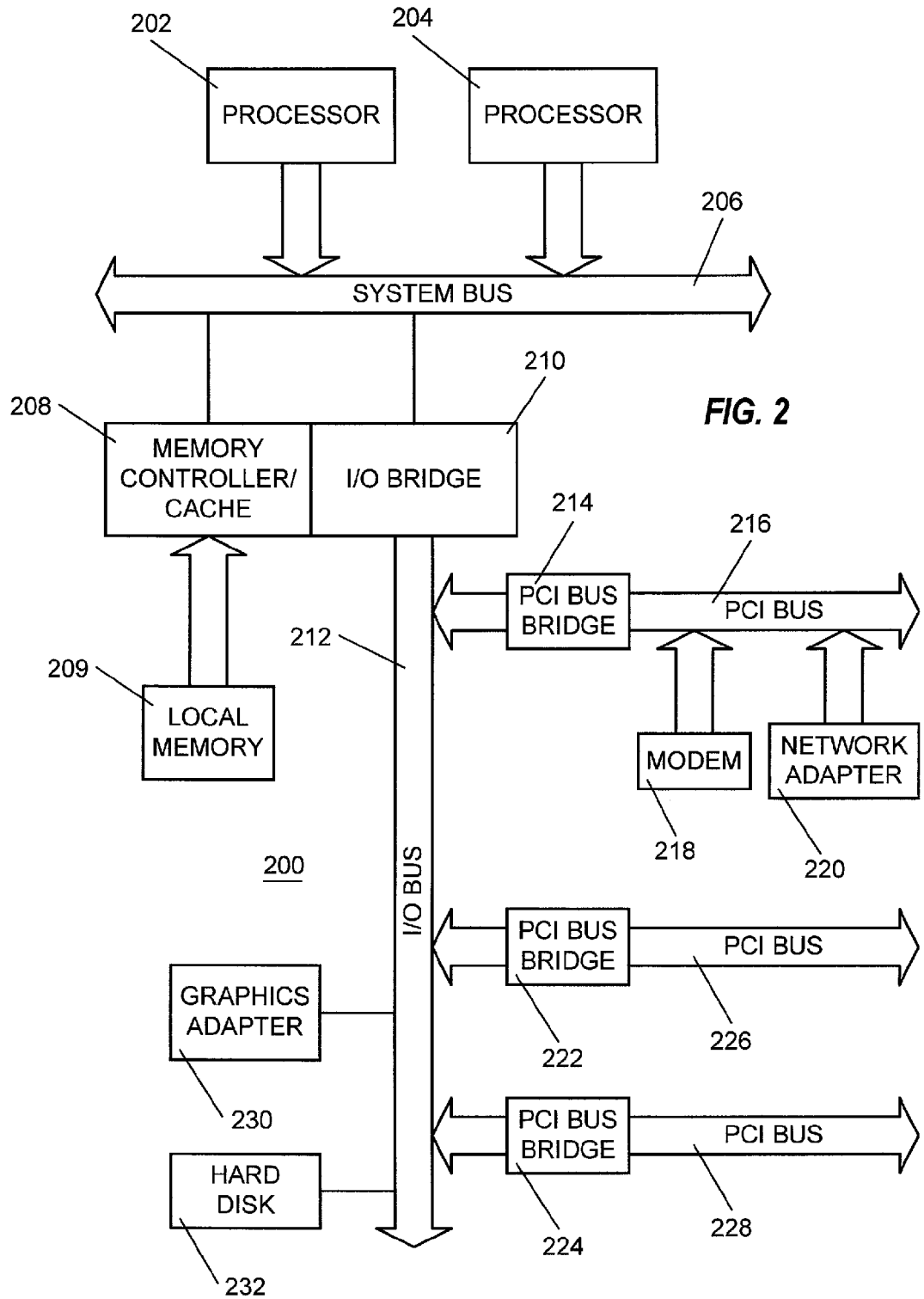
FIG. 2 is an exemplary block diagram of a server apparatus according to an embodiment of the invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted.

The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2-UDB database platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
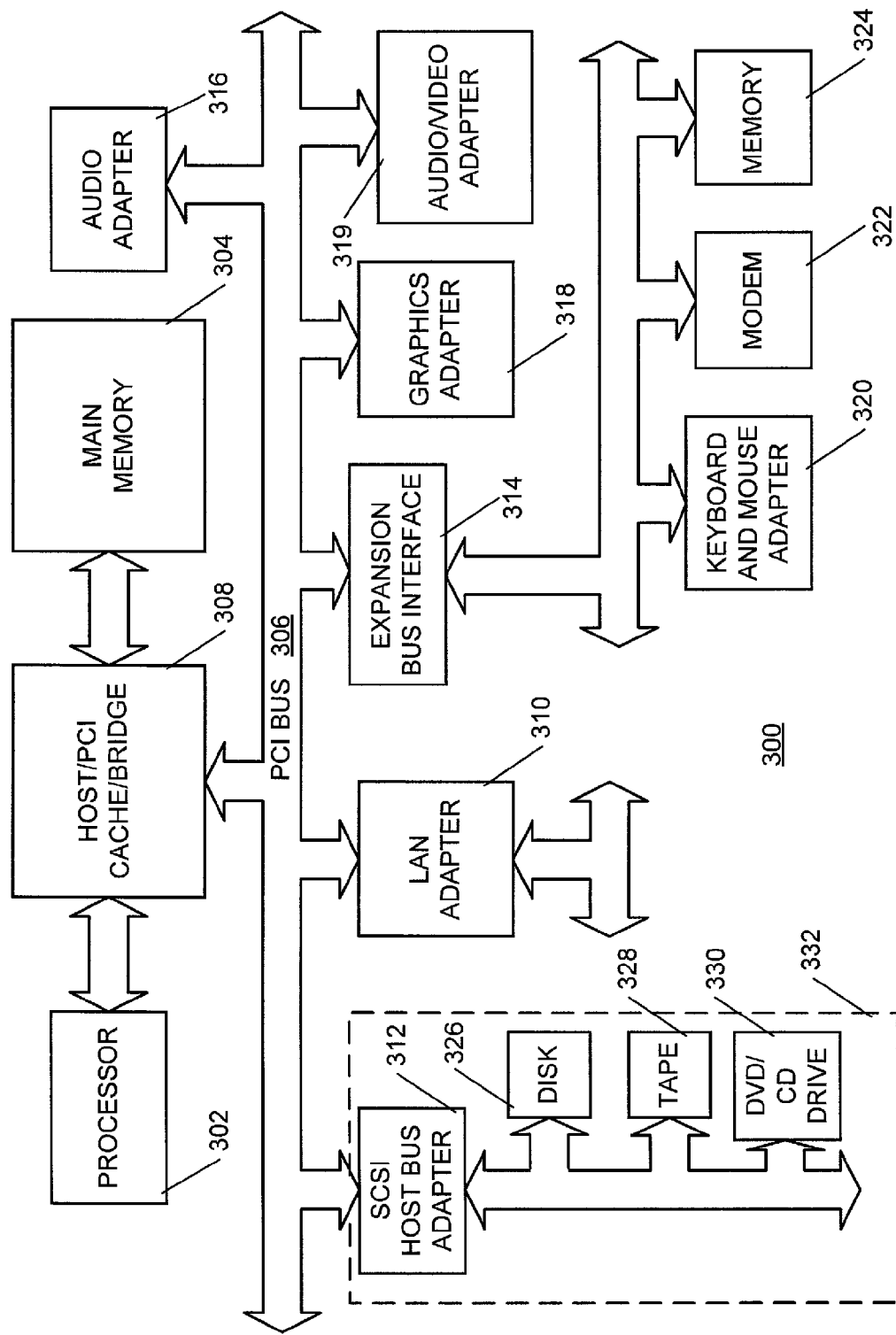
FIG. 3 is an exemplary block diagram of a client apparatus according to an embodiment of the invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

As will be appreciated by one skilled in the art, aspects of the present invention may be embodied as a system, method or program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The flowcharts and block diagrams in the figures illustrate architecture, functionality, and operation of possible implementations of systems, methods and program products according to various embodiments of the present invention. In this regard, each block in the flowcharts or block diagrams may represent a module, segment, or portion of code, which comprises one or more executable program instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like. The database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access by Microsoft Corporation (Redmond, Wash.), or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Furthermore, the described features, structures, or characteristics of the invention may be combined in any suitable manner in one or more embodiments. Correspondingly, even if features are initially claimed as acting in certain combinations, one or more features from a claimed combination can in some cases be excised from the combination, and the claimed combination can be directed to a subcombination or variation of a subcombination.

In the descriptions herein, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Benefits, advantages and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein are illustrative of the invention and its best mode and are not intended to otherwise limit the scope of the present invention in any way. Other variations are within the scope of the following claims.

While this specification contains many specifics, these should not be construed as limitations on the scope of the invention or of what can be claimed, but rather as descriptions of features specific to particular implementations of the invention. Headings herein are not intended to limit the invention, embodiments of the invention or other matter disclosed under the headings.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for internationalizing a target computer program, comprising:
    associating a text string in the target computer program with an attribute of a user-interface element, wherein the target computer program includes program code conforming to a certain programming language syntax, including a non-executable annotation syntax, the user interface element being defined in the target computer program, wherein the associating is provided, at least in part, by forming a user interface element annotation in the non-executable annotation syntax and inserting the user interface element annotation, with the text string therein, in the target computer program; and
    causing the text string in the target computer program's user interface element annotation to be displayed on the attribute for a displayed instance of the user interface element by a computer system executing an internationalize method of the target computer program, wherein executing the internationalize method obtains the displayed text string directly from the text string of the user interface element annotation.

2. The method of claim 1, wherein obtaining the displayed text string comprises:
    extracting the text string from the user interface element annotation by executing the internationalize method, and the method further comprising:
    defining a name for a resource bundle to which the text string of the user interface element annotation may be extracted, wherein the defining is provided, at least in part, by a resource bundle annotation in the target computer program; and
    creating the resource bundle by a computer system executing an annotation processor program, wherein the executing annotation processor program processes source code of the target computer program, including processing the user interface element annotation and resource bundle annotation.

3. The method of claim 2, wherein the method comprises:
    forming the resource bundle annotation in the non-executable annotation syntax and inserting the resource bundle annotation, with the resource bundle name therein, in the target computer program, and wherein processing the user interface element annotation and resource bundle annotation comprises:
    the annotation processor program extracting the text string from the user interface element annotation, extracting the resource bundle name from the resource bundle annotation and storing the text string in computer readable storage media as a resource bundle having the extracted resource bundle name.

4. The method of claim 2, wherein obtaining the displayed text string directly from the text string of the user interface element annotation is in response to determining that the resource bundle does not exist.

5. The method of claim 1, wherein for causing the text string to be displayed on the respective attribute of the user interface element, executing the internationalization method comprises:
    determining the attribute of the user interface element for which an internationalized text string is to be displayed by reading the parsed user interface element annotation.

6. The method of claim 5, wherein in response to an instance wherein executing the internationalize method determines that the resource bundle exists, the executing of the internationalize method obtains the displayed text string by:
    parsing the resource bundle annotation;
    reading the file name of the resource bundle from the parsed resource bundle annotation; and
    reading the text string in the resource bundle for the respective attribute of the interface element determined from reading the parsed user interface element annotation.

* * * * *